(12) United States Patent
Herth

(10) Patent No.: US 7,378,590 B1
(45) Date of Patent: May 27, 2008

(54) ELECTRICAL BOX WITH MULTI-MOUNT FEATURES

(76) Inventor: Greg Herth, 10 Tower Mews, P.O. Box 507, Oakdale, NY (US) 11769-2420

(*) Notice: Subject to any disclaimer, the term of this patent is extended or adjusted under 35 U.S.C. 154(b) by 0 days.

(21) Appl. No.: 11/640,084

(22) Filed: Dec. 15, 2006

(51) Int. Cl.
*H02G 3/08* (2006.01)
(52) U.S. Cl. .............................. 174/50; 174/58; 174/64; 439/535; 248/906
(58) Field of Classification Search ................. 174/50, 174/58, 64, 17, 135, 57, 60, 17.18, 48, 49; 220/3.9, 3.3, 3.4, 3.5, 3.6, 3.92; 439/535; 248/906, 544; 33/528
See application file for complete search history.

(56) References Cited

U.S. PATENT DOCUMENTS

| | | | |
|---|---|---|---|
| 1,133,946 A | | 3/1915 | Farrell |
| 2,757,817 A | * | 8/1956 | Egan ........................... 220/3.5 |
| 4,297,525 A | | 10/1981 | Bowden, Jr. |
| 4,328,903 A | * | 5/1982 | Baars ........................... 220/3.7 |
| 5,378,854 A | | 1/1995 | Hoover |
| 5,596,174 A | | 1/1997 | Sapienza |
| 5,600,093 A | | 2/1997 | Herth et al. |
| 5,603,424 A | | 2/1997 | Bordwell et al. |
| 6,342,675 B1 | * | 1/2002 | DeBartolo, Jr. et al. ...... 174/50 |
| 6,642,446 B2 | * | 11/2003 | Dodds et al. .................. 174/50 |
| 6,756,541 B1 | * | 6/2004 | Mollick et al. ................ 174/58 |
| 6,831,228 B2 | * | 12/2004 | Lalancette et al. ............ 174/58 |
| 6,858,802 B2 | * | 2/2005 | Hagarty et al. ............... 174/58 |
| 6,909,045 B2 | | 6/2005 | Halbert |
| 6,997,747 B1 | * | 2/2006 | Norte et al. ................. 439/607 |
| 7,214,875 B1 | | 5/2007 | Gretz |
| 7,307,213 B1 | | 12/2007 | Gretz |

* cited by examiner

*Primary Examiner*—Dhiru R. Patel
(74) *Attorney, Agent, or Firm*—Alfred M. Walker

(57) ABSTRACT

A multi-use electrical box has first and second side walls, lower and upper walls, which, together, form a front opening into the electrical box, and a rear wall. The first side wall includes a plurality of removable alignment tabs extending therefrom. The lower and upper walls each have external grooves which accommodate external attachment nails for the electrical box. One or more exit holes are provided in the first side wall for fastener screws. A slidable wall is removably mounted in the electrical box to receive one or more fastener screws at desired locations within the box.

9 Claims, 3 Drawing Sheets

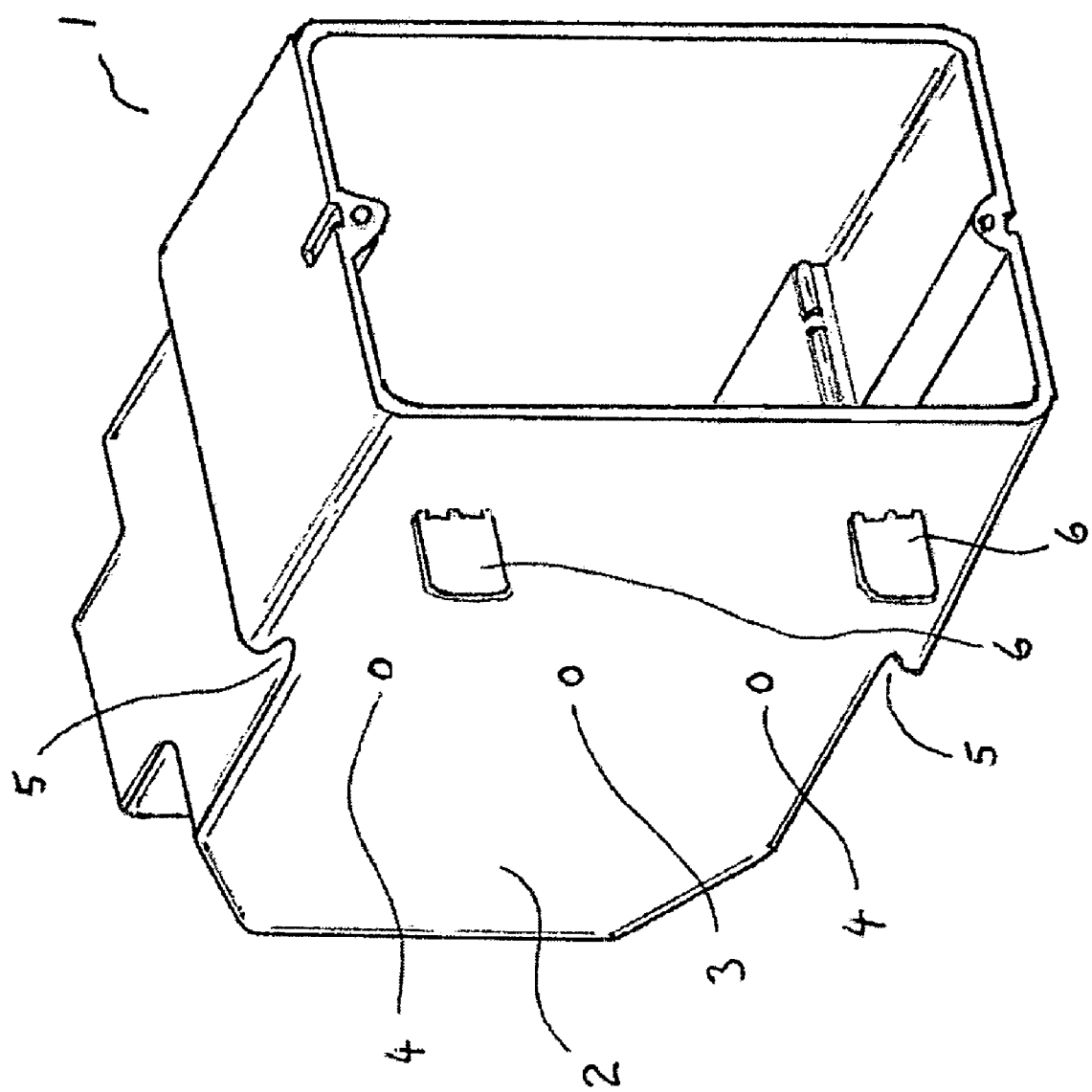

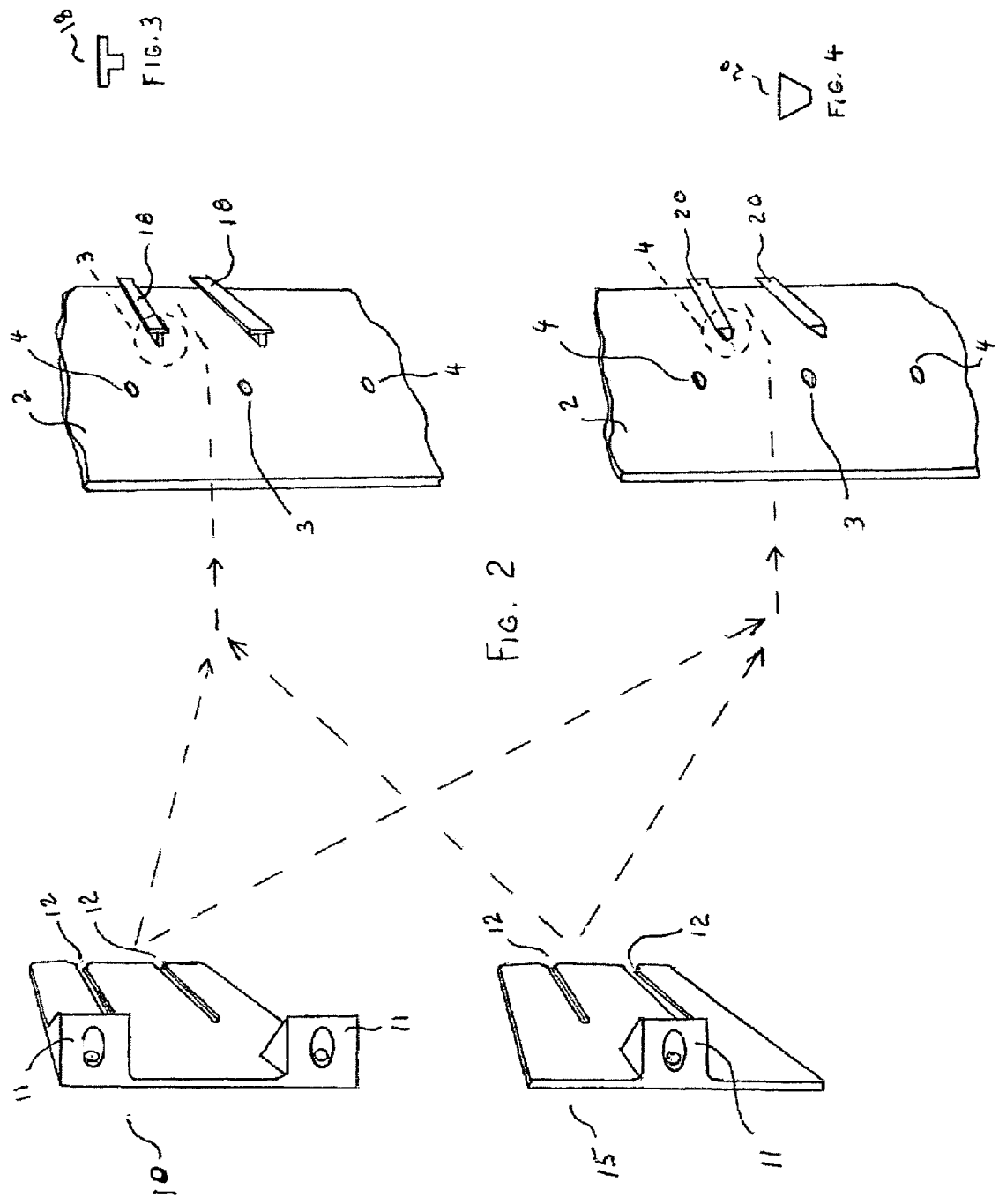

US 7,378,590 B1

ELECTRICAL BOX WITH MULTI-MOUNT FEATURES

FIELD OF THE INVENTION

The present invention relates to adaptable electrical boxes with multiple uses.

BACKGROUND OF THE INVENTION

Molded electrical boxes designed for nail attachment to wooden beams or studs are well known in the industry. Molded electrical boxes with internal screw attachment are known in the prior art. U.S. Pat. No. 5,600,093 of Herth et al. describes such a dual purpose electrical box which is attached by two internal screws; it is especially convenient to use for old work. A pending application of Herth describes an electrical box for single fastener attachment using a single internal screw, for new work, two anti-rotation and positioning tabs are molded onto the mounting side of the box. The prior art does not reveal molded electrical boxes equipped with features permitting the three different types of attachment methods described above.

OBJECTS OF THE INVENTION

It is therefore an object of the present invention to provide an adaptable electrical box with multiple attachment locations for multiple uses.

It is also an object of this invention to improve over the disadvantages of the prior art.

SUMMARY OF THE INVENTION

In keeping with these objects and others which may become apparent, this invention is a molded electrical box with features which make it adaptable to external nail attachment to a beam or stud as well as either single or dual internal screw attachment. The electrical box is usable for new work or for old work where the internal screw feature permits convenient attachment through a hole in the wall surface adjacent to a stud that is sized to the perimeter of the box. Resetting of the box to accommodate a modification of a wall surface which affects the thickness of the wall covering is also facilitated by the internal screw features.

A single molded electrical box serves the needs of three separate sub markets for both new and old work. Thus the box can be molded in high volume using techniques which take advantage of economy of scale, such as an eight cavity mold. The electrical box has a smooth outer mounting wall surface with a plurality of exit holes, such as, for example, three screw fastener exit holes. Inside, on the mounting wall are molded one or more short parallel rails having a particular geometric crosssectional configuration, such as two rails, with, for example, a "T" or dovetail crossection (or any other engaging geometrical crossectional shape). A separate mounting block with corresponding mounting slots is slid onto the rails and pushed to the back end of the electrical box. The rails may have any geometric shaped crosssectional configuration mating with a corresponding inverse geometric configuration of the mounting slots. Mounting blocks are molded in several varieties, for multiple fasteners, such a pair of fasteners or otherwise, or for single fastener mounting. They have either a single angled screw guide in the middle or a plurality of separate angled screw guides at the distal side edges of the block. When inserted in the electrical box on the rails are provided, the mounting block exit hole or holes for the screw fastener or fasteners line up in registration with the center fastener exit hole in the electrical box or with the plurality of outer exit holes on the mounting side of the electrical box. The electrical box also has a plurality of alignment tabs, such as a pair of tabs, molded at right angles to the mounting side of new work; these also act as anti-rotation tabs in case the single screw fastener option is selected. These tabs have break-off perforations for easy removal for old work use.

For nail attachment in new work, nails are inserted across a recess at the top and bottom of the electrical box each nail supported by a molded groove the full width of the box and one or more capturing straps which are molded to capture the opposite surface of the nail shaft thus forming a nail guide which is the equivalent of brackets with holes. While two or more straps are preferable, if a single strap extends longitudinally of a sufficient length, it may also form a nail guide.

BRIEF DESCRIPTION OF THE DRAWINGS

The present invention can best be understood in connection with the accompanying drawings. It is noted that the invention is not limited to the precise embodiments shown in drawings, in which:

FIG. 1 is a perspective view of a molded electrical box of this invention;

FIG. 2 is a perspective view of a two fastener mounting block, a single fastener mounting block, two mounting rails with "T" crossection, and two mounting rails with a dovetail crossection;

FIG. 3 is an end view of a rail with a "T" crossection;

FIG. 4 is an end view of a rail with a dovetail crossection;

DETAILED DESCRIPTION OF THE INVENTION

Figure 5:
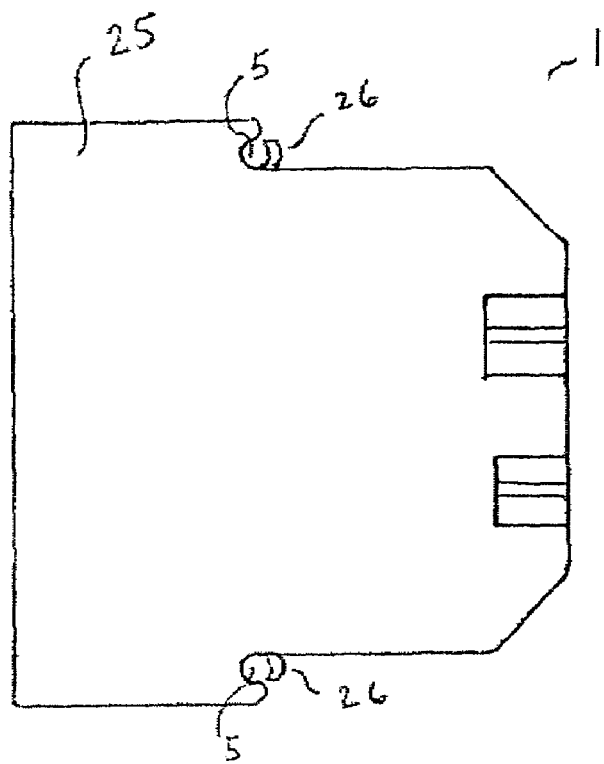
FIG. 5 is a non-mounting side view of the molded electrical box shown nail groove and straps which form nail guides and, FIG. 6 is a back elevation showing nails mounted on electrical box.

The present invention has broad applications to many new work and old work electrical boxes of varying configurations. For illustrative purposes only, a preferred mode for carrying out the invention is described herein the drawing Figures.

Molded multi-mount electrical box 1 is shown in FIG. 1. Mounting side 2 has three fastener exit holes, center 3 and two side holes 4. Center hole 3 is used for single fastener attachment wherein alignment tabs 6 also double as anti-rotation tabs for new work applications. The two side holes 4 would be used for two-fastener screw attachment. Also seen in this view is one end of grooves 5 which support attachment nails (if used). This box will accommodate all three attachment methods with appropriate accessories. Tabs 6 are removed for old work applications.

FIG. 2 shows two-fastener mounting block 10 with dual angled screw guides 11 and mounting slots 12. Also shown is single fastener mounting block 15 with single angled screw guide 11 and mounting slots 12. Either of these mounting blocks 10 or 15 is mounted on the inside of mounting wall 2 of electrical box 1 on a pair of "T" crossection rails 18 (see FIG. 3) or on a pair of dovetail rails 20 (see FIG. 4) which are integrally molded on the inside surface of wall 2. The holes in the angled guides 11 are in positional registration with either exit hole 3 or holes 4 in wall 2 when slots 12 pushed in to the full extent onto rails 18 or 20.

Figure 6:
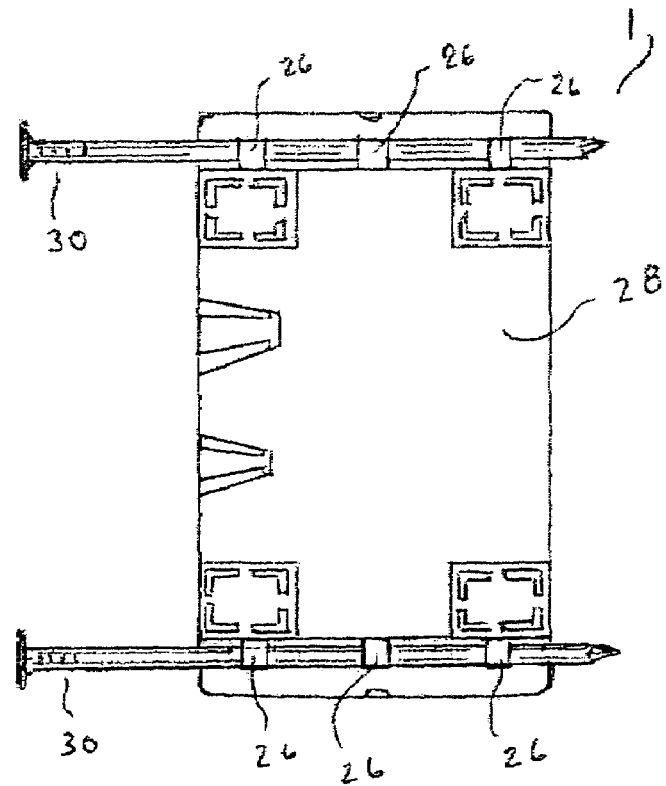

FIGS. 5 and 6 illustrate the use of fastening nails with electrical box 1. Non-mounting side 25 is shown in FIG. 5 with nail groove 5 and mounting straps 26 forming a transverse nail guide to accept nails 30, as shown in back view FIG. 6. The back 28 of electrical box 1 is shown extending from nails 30 each captured by three molded strap members 26. While FIG. 6 shows one example depicting, for example, three straps 26, it is noted that any number of straps 26, such as one or more straps 26, may be used to capture nail 30.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. A multi-use electrical box comprising:
   first and second side walls, lower and upper walls forming a front opening into said electrical box, and a rear wall;
   said first side wall having a pair of removable alignment tabs extending therefrom;
   said lower and upper walls having external grooves for accommodating external attachment nails;
   a plurality of exit holes in said first side wall for at least one fastener screw;
   means removably mounted in said electrical box for receiving said at least one fastener screw, said removably mounted means comprises a single fastener mounting block for a single fastener or a two fastener mounting block for a dual set of fasteners, a single angled screw guide for said at least one fastener screw in registry with one of said plurality of exit holes; or,
   a plurality of angled screw guides for a plurality of said fastener screws in registry with said plurality of exit holes;
   an interior surface of said first side wall has at least one rail for receiving either said single fastener mounting block or said two fastener mounting block for said dual set of fasteners said mounting block comprising said removably mounted means;
   each of said mounting blocks having at least one partially extending, closed ended mounting slot for engaging said at least one rail located inside of said first side wall, wherein said plurality of exit holes in said first side wall are in positional register with said plurality of screw guides in said mounting block when said at least one slot is pushed in said box to the full extent onto said at least one rail, and,
   said at least one slot is the same size as said at least one rail.

2. The electrical box of claim 1 wherein said at least one fastener screw is a plurality of fastener screws.

3. The electrical box of claim 1 in which said rails each have a T-shaped cross section.

4. The electrical box of claim 1 in which said rails each have a dove tail-shaped cross section.

5. The electrical box of claim 1 in which each of said external grooves has mounting straps forming a transverse rail to accept an external attachment nail.

6. The electrical box of claim 5 in which each said external groove has an opening facing the front opening of said of said electrical box.

7. The electrical box of claim 1 in which said side walls, lower and upper walls, rear wall, tabs, rails and said mounting straps are of single piece molded construction.

8. The electrical box of claim 1 in which said rails have a geometric crossectional configuration mating with a corresponding inverse geometric crossectional configuration of said mounting slots.

9. A multi-use electrical box comprising:
   first and second side walls, lower and upper walls forming a front opening into said electrical box, and a rear wall;
   said first side wall having a pair of removable alignment tabs extending therefrom;
   said lower and upper walls having external grooves for accommodating external attachment nails;
   a plurality of exit holes in said first side wall for at least one fastener screw;
   means removably mounted in said electrical box for receiving said at least one fastener screw, said removably mounted means comprises a single fastener mounting block for a single fastener-or a two fastener mounting block for a dual set of fasteners, a single angled screw guide for said at least one fastener screw in registry with one of said plurality of exit holes; or,
   a plurality of angled screw guides for a plurality of said fastener screws in registry with said plurality of exit holes;
   an interior surface of said first side wall has a plurality of rails for receMng either said single fastener mounting block or said two fastener mounting block for said dual set of fasteners said mounting block comprising said removably mounted means;
   each of said mounting blocks having a plurality of partially extending, closed ended mounting slots for engaging said plurality of rails located inside of said first side wall, wherein said plurality of exit holes in said first side wall are in positional register with said plurality of screw guides in said mounting block when each slot of said plurality of slots are pushed in said box to the full extent onto each rail of said plurality of rails, and,
   each of said plurality of slots is the same size as each said rail of said plurality of rails.

* * * * *